(12) United States Patent
Merlin et al.

(10) Patent No.: US 9,319,174 B2
(45) Date of Patent: *Apr. 19, 2016

(54) VERIFYING SUPPORT FOR REQUESTS FOR TRANSMISSION PARAMETERS IN A MULTI-USER SCENARIO

(75) Inventors: Simone Merlin, San Diego, CA (US); Albert Van Zelst, Woerden (NL); Maarten Menzo Wentink, Naarden (NL)

(73) Assignee: QUALCOMM Incorporated, San Diego, CA (US)

(*) Notice: Subject to any disclaimer, the term of this patent is extended or adjusted under 35 U.S.C. 154(b) by 989 days.

This patent is subject to a terminal disclaimer.

(21) Appl. No.: 13/444,154

(22) Filed: Apr. 11, 2012

(65) Prior Publication Data

US 2013/0272210 A1    Oct. 17, 2013

(51) Int. Cl.
| | | |
|---|---|---|
| *H04W 4/00* | (2009.01) | |
| *H04L 1/00* | (2006.01) | |
| *H04B 7/04* | (2006.01) | |
| *H04B 7/06* | (2006.01) | |
| *H04L 1/06* | (2006.01) | |

(52) U.S. Cl.
CPC ............ *H04L 1/0023* (2013.01); *H04B 7/0413* (2013.01); *H04B 7/0617* (2013.01); *H04B 7/0619* (2013.01); *H04L 1/06* (2013.01)

(58) Field of Classification Search
CPC ..................................................... H04B 7/0619
USPC ........................................................ 370/329
See application file for complete search history.

(56) References Cited

U.S. PATENT DOCUMENTS

| | | | |
|---|---|---|---|
| 2008/0080635 | A1 | 4/2008 | Hugl et al. |
| 2009/0323849 | A1 | 12/2009 | Bala et al. |
| 2010/0054191 | A1 | 3/2010 | Higuchi et al. |
| 2010/0093361 | A1 | 4/2010 | Sohn, III et al. |
| 2011/0065444 | A1 | 3/2011 | Sato et al. |
| 2011/0128947 | A1* | 6/2011 | Liu et al. ................. 370/338 |
| 2011/0199946 | A1 | 8/2011 | Breit et al. |
| 2012/0063439 | A1* | 3/2012 | Seok ......................... 370/338 |
| 2012/0120839 | A1* | 5/2012 | Liu et al. ................. 370/252 |
| 2012/0140753 | A1* | 6/2012 | Lee et al. ................. 370/338 |
| 2012/0230443 | A1* | 9/2012 | Seok et al. ............... 375/260 |
| 2012/0269183 | A1* | 10/2012 | Sohn et al. .............. 370/338 |
| 2012/0294255 | A1* | 11/2012 | Seok et al. ............... 370/329 |
| 2013/0010632 | A1* | 1/2013 | Wang et al. .............. 370/252 |
| 2013/0058239 | A1* | 3/2013 | Wang et al. .............. 370/252 |
| 2013/0188567 | A1* | 7/2013 | Wang et al. .............. 370/329 |

(Continued)

FOREIGN PATENT DOCUMENTS

| | | | |
|---|---|---|---|
| WO | WO2010150950 A1 | 12/2010 | |
| WO | WO 2012070872 A1 * | 5/2012 | |

(Continued)

*Primary Examiner* — Shripal Khajuria
(74) *Attorney, Agent, or Firm* — Dang M. Vo

(57) ABSTRACT

Link adaptation is supported in a multi-user MIMO environment. In some aspects, a frame including a transmission parameter request (e.g., a null data packet announcement (NDPA) including a modulation and coding scheme (MCS) request (MRQ)) specifies multiple destinations. In some aspects, a decision to transmit a frame specifying multiple destinations is based on whether all of destinations support providing feedback to such a frame. In some aspects, transmission parameter feedback (e.g., MCS feedback (MFB)) including channel estimate information is provided in a case where MFB of type MU is requested.

20 Claims, 11 Drawing Sheets

(56) References Cited

U.S. PATENT DOCUMENTS

| | | | |
|---|---|---|---|
| 2013/0188630 A1* | 7/2013 | Song et al. | 370/338 |
| 2013/0223427 A1* | 8/2013 | Sohn et al. | 370/338 |
| 2013/0235836 A1* | 9/2013 | Roh et al. | 370/329 |
| 2013/0250904 A1* | 9/2013 | Kang et al. | 370/329 |
| 2013/0272209 A1 | 10/2013 | Merlin et al. | |
| 2013/0272347 A1 | 10/2013 | Merlin et al. | |
| 2013/0294397 A1* | 11/2013 | Lee et al. | 370/329 |
| 2013/0336306 A1* | 12/2013 | Sohn et al. | 370/338 |
| 2014/0307602 A1* | 10/2014 | Seok | 370/311 |

FOREIGN PATENT DOCUMENTS

| WO | WO 2012087054 A2 * | 6/2012 |
|---|---|---|
| WO | WO 2012111939 A2 * | 8/2012 |

* cited by examiner

VERIFYING SUPPORT FOR REQUESTS FOR TRANSMISSION PARAMETERS IN A MULTI-USER SCENARIO

CROSS-REFERENCE TO RELATED APPLICATIONS

This application is related to concurrently filed and commonly owned U.S. patent application Ser. No. 13/444,134, entitled "REQUESTS FOR TRANSMISSION PARAMETERS IN A MULTI-USER SCENARIO," filed Apr. 11, 2012; and U.S. patent application Ser. No. 13/444,176, entitled "PROVIDING TRANSMISSION PARAMETERS FOR MULTI-USER COMMUNICATION," filed Apr. 11, 2012; the disclosure of each of which is hereby incorporated by reference herein.

BACKGROUND

1. Field

This application relates generally to wireless communication and more specifically, but not exclusively, to link adaptation for multi-user wireless communication.

2. Introduction

In some types of multiple access wireless communication systems, an access point (e.g., a base station) provides network connectivity and other services for access terminals (e.g., cell phones, computers, etc.) in the vicinity of the access point. In some cases, the access point may communicate using a single-user (SU) mode (e.g., using beamforming to communicate with a given access terminal) or using a multi-user (MU) mode (e.g., using multi-user multiple input multiple output (MU-MIMO) to concurrently communicate with several access terminals).

A MU-MIMO mode of operation may be used to enable concurrent communication between an access point and multiple access terminals. For example, in an IEEE 802.11ac compliant system, an 802.11ac base station may employ MU-MIMO to communicate with several stations. An access point of a MIMO system employs multiple antennas for data transmission and reception while each access terminal employs one or more antennas. The access point communicates with the access terminals via forward link channels and reverse link channels. A forward link (or downlink) channel refers to a communication channel from a transmit antenna of the access point to a receive antenna of an access terminal, and a reverse link (or uplink) channel refers to a communication channel from a transmit antenna of an access terminal to a receive antenna of the access point.

MIMO channels corresponding to transmissions from a set of transmit antennas to a receive antenna are referred to as spatial streams since precoding (e.g., beamforming) is employed to direct the transmissions toward the receive antenna. Consequently, in some aspects each spatial stream corresponds to at least one dimension. A MIMO system provides improved performance (e.g., higher throughput and/or greater reliability) through the use of the additional dimensionalities provided by these spatial streams.

The quality of the channel between the access point and each of the access terminals is generally taken into account when selecting transmission parameters (e.g., modulation and coding scheme (MCS)) for transmissions from the access point to the access terminals. For example, the access point may send a training sequence to the access terminals, and request each access terminal to provide feedback including a channel estimate derived from the training sequence and a transmission parameter estimate that is based on that channel estimate. The access point may then use these transmission parameter estimates to control subsequent transmissions to the access terminals. As a specific example, an 802.11 base station broadcasts a null data packet announcement (NDPA) frame including an MCS request (MRQ), followed by the null data packet (NDP). A station responds to this request with MCS feedback (MFB). To support such a link adaptation scheme, various specifications have been defined for managing the transmission parameters.

For example, under 802.11, if MFB is sent in the same PLCP Protocol Data Unit (PPDU) as a Very High Throughput Compressed Beamforming (VHT-CB) frame of type SU, the MFB responder shall estimate the recommended MFB under the assumption that the MFB requester will use the steering matrices (e.g., channel estimate) indicated by the VHT-CB frame. Also, if the MFB requester sends the MRQ in an NDPA requesting SU-beamforming feedback, then the MFB responder shall include the corresponding MFB feedback in the response VHT-CB frame.

While the above specifications address SU mode, these specifications do not address link adaptation for MU mode. Accordingly, there is a need for effective techniques for providing link adaptation for MU mode.

SUMMARY

A summary of several sample aspects of the disclosure follows. This summary is provided for the convenience of the reader and does not wholly define the breadth of the disclosure. For convenience, the term some aspects is used herein to refer to a single aspect or multiple aspects of the disclosure.

The disclosure relates in some aspects to link adaptation in an MU environment. For example, in an 802.11-based system, link adaptation is supported in a case where an NDPA specifies multiple destinations (e.g., stations) and/or where MFB of type MU is requested.

The disclosure relates in some aspects to a link adaptation request that is included in a frame directed to multiple destinations. For example, an access point may transmit a frame that includes a feedback request (e.g., an MRQ in an NDPA) and that identifies multiple stations. In this case, all of the stations identified in the frame may provide the requested feedback at some point in time. Accordingly, in some aspects, a wireless communication scheme in accordance with the teachings herein may involve: receiving a frame at a first apparatus, wherein the frame comprises a request for at least one transmission parameter and further comprises identifiers of a plurality of apparatuses; determining that the first apparatus is identified by one of the identifiers; and transmitting the requested at least one transmission parameter as a result of the determination.

The disclosure relates in some aspects to allowing a frame that identifies multiple destinations to include a feedback request only when each of these destinations has indicated that providing such feedback is currently supported. For example, in some aspects, such a request is not sent if any one of the recipients is unable to decode the frame including the request. Accordingly, in some aspects, a wireless communication scheme in accordance with the teachings herein may involve: determining whether each apparatus of a plurality of apparatuses has indicated that responses will be provided to requests for at least one transmission parameter; and transmitting a frame as a result of the determination, wherein the frame comprises a request for the at least one transmission parameter from the plurality of apparatuses and further comprises identifiers of the plurality of apparatuses.

The disclosure relates in some aspects to defining the meaning of a link adaptation response that is included in the same frame as a channel estimation report. For example, when a station is responding to a feedback request with an MU channel estimate, the station may provide a transmission parameter estimate that is generated assuming that the channel estimate will be used for a SU transmission. Accordingly, in some aspects, a wireless communication scheme in accordance with the teachings herein may involve: estimating at least one transmission parameter for single-user beamformed transmission based on a channel estimate for multi-user transmission by an apparatus; generating a frame including the channel estimate and the at least one transmission parameter; and transmitting the frame to the apparatus.

BRIEF DESCRIPTION OF THE DRAWINGS

These and other sample aspects of the disclosure will be described in the detailed description and the claims that follow, and in the accompanying drawings, wherein:

Figure 1:
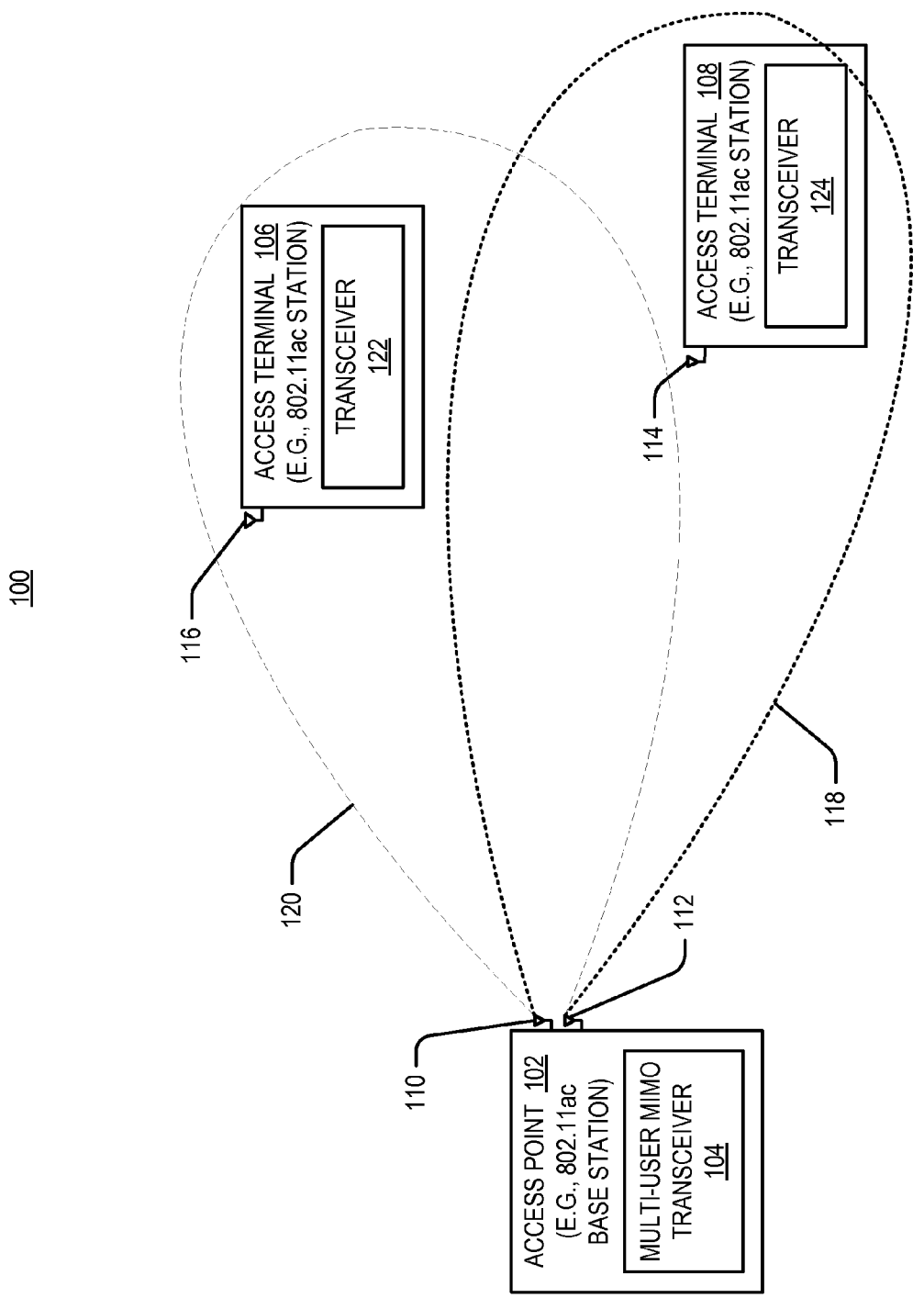
FIG. 1 is a simplified block diagram of several sample aspects of a wireless communication system configured to support link adaption in an MU environment in accordance with the teachings herein.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, an apparatus for wireless communication comprises: a transceiver configured to receive a frame, wherein the frame comprises a request for at least one transmission parameter and further comprises identifiers of a plurality of apparatuses; and a processing system configured to determine that the apparatus is identified by one of the identifiers, wherein the transceiver is further configured to transmit the requested at least one transmission parameter as a result of the determination. Moreover, in some aspects, the frame comprises a null data packet announcement (NDPA) frame.

FIG. 1 illustrates sample aspects of a wireless local area network (WLAN) 100 where an access point 102 including a MU-MIMO transceiver 104 communicates with an access terminal 106 and an access terminal 108. The access terminals 106 and 108 represent wireless communication devices (e.g., 802.11 ac devices) that may be referred to as users, stations, destinations, user equipment, user devices, clients, and so on in various implementations. Each of the access terminals 106 and 108 includes a transceiver 122 and 124, respectively, for communicating with the access point 102. In this example, the access point 102 includes two transmit antennas 110 and 112, the access terminal 106 includes one receive antenna 116, and the access terminal 108 includes one receive antenna 114.

The MU-MIMO transceiver 104 employs precoding (e.g., beamforming) for transmissions via the antennas 110 and 112 such that a spatial stream 118 (as represented in simplified form by a corresponding dashed line) is directed to the access terminal 106 and a spatial stream 120 (again, represented by a corresponding dashed line) is directed to the access terminal 108. It should be appreciated that the teachings herein are applicable to other implementations that include a different number of transmit antennas, a different number of receive antennas, a different number of access terminals, and a different number of spatial streams.

Figure 2:
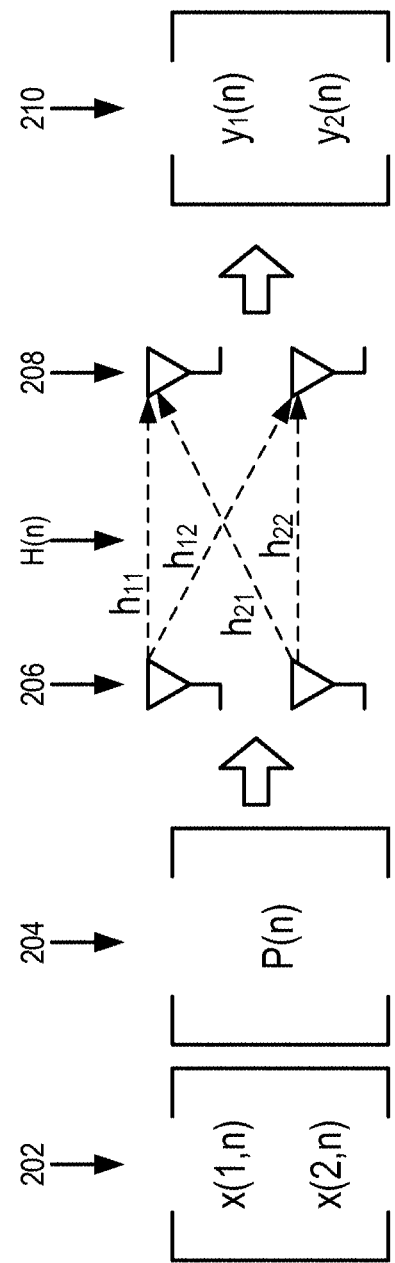
FIG. 2 is a simplified diagram of sample MU-MIMO transmissions.

FIG. 2 illustrates a simplified example of signal transmission from the access point for the case where there are two access terminals. Here, as in the example of FIG. 1, two transmit antennas are used to send information to the two access terminals, each of which has a single receive antenna. As represented by the matrix 202, the access point generates an output signal $x(1,n)$ destined for the first access terminal and generates an output signal $x(2,n)$ destined for the second access terminal. The parameter n represents that the signals are sent over n tones using orthogonal frequency-division multiplexing (OFDM). The output signals are applied to a precoding matrix 204 (e.g., with elements $P_{11}$, $P_{12}$, $P_{21}$, and $P_{22}$ for a 2×2 matrix. The result of this operation is transmitted via two antennas 206. The resulting signals are transmitted via a channel matrix $H(n)$ to the receive antennas 208, where the channels associated with the different transmit antenna-receive antenna pairs are represented by $h_{11}$, $h_{12}$, $h_{21}$, and $h_{22}$ as shown. The received signals are represented by a matrix 210 where, as stated above, one receive antenna is associated with each access terminal. Here, the signal $y_1(n)$ is the signal received at one access terminal and the signal $y_2(n)$ is the signal received at the other access terminal. As mentioned above, in some aspects, link adaptation involves determining which transmission parameters (e.g., MCS) are to be used for transmissions over the channels between the access point and the access terminals.

Figure 3:
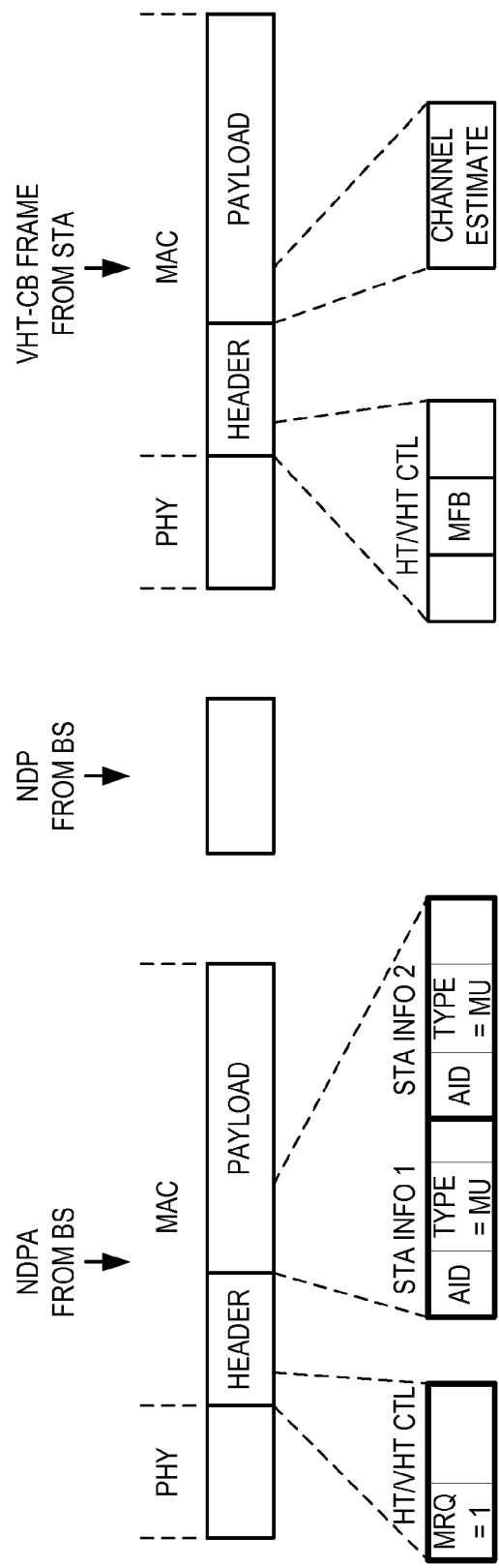
FIG. 3 is a simplified diagram of frames that may be employed in 802.11ac in accordance with the teachings herein.

In accordance with the teachings herein, link adaptation is supported for an MU environment through the definition of certain information fields in frames and actions to be taken when using such frames. FIG. 3 illustrates several examples of frames that may be employed in 802.11ac to support MU link adaptation. In this example, a base station (BS) broadcasts an NDPA and an NDP, and each station (STA) transmits a VHT-CB frame.

The NDPA frame of FIG. 3 comprises PHY and MAC sections. The MAC section includes a header and a payload. The header includes a high throughput/very high throughput control (HT/VHT CTL) field. As indicated by the HT/VHT nomenclature used herein, this control field has two forms: a high throughput (HT) variant and a very high throughput (VHT) variant. This disclosure is primarily directed to the VHT variant. The MRQ field of the HT/VHT control field is set equal to 1 to indicate that MCS feedback is being requested. The payload includes station information (STA Info) fields. In accordance with the teachings herein, the STA Info fields identify multiple destination stations. In the example of FIG. 3, the association identifier (AID) fields in the different STA Info fields will include identifiers for different stations. For example, the identifiers may comprise local addresses of the stations or some other suitable identifiers. Each STA Info field also includes a feedback type field that may be set to SU or MU. The feedback type fields refer the type of channel information that is to be sent back. In the example of FIG. 3, these fields are set to MU.

The VHT-CB frame also comprises PHY and MAC sections, where the MAC section includes a header and a payload. This header also includes an HT/VHT control field. In this case, the HT/VHT control field includes an MFB field that the station uses to send back the requested MCS, etc. In those scenarios where the station provides a channel estimate with the MFB, this channel estimate is included in the payload of the VHT-CB frame.

In accordance with one aspect of the disclosure, an MRQ is allowed in an NDPA with multiple STA Info fields as depicted in FIG. 3. As discussed in more detail below, this is allowed as long as all of the stations listed in the NDPA support the reception of an MRQ. The MRQ is intended to solicit an MFB response from all of the stations listed in the NDPA. Each of these stations shall then reply with MFB in the VHT-CB report frame. The above scheme may be used when either MU or SU type of feedback is specified in the NDPA.

In an alternative aspect, an NDPA with an MRQ may instead be defined as soliciting a response only from the first station listed in the NDPA. In this case, responses from the remaining stations may be obtained, for example, by polling the remaining stations at a later point in time.

Thus, for an 802.11 environment, in the case of an NDPA frame with multiple STA Info fields and carrying a VHT format of HT Control field with MRQ set to 1, the MRQ is intended to solicit an MFB response from all (or, in some aspects, the first one of) the STAs listed in the AID field of the STA Info fields. In addition, an NDPA frame with multiple STA Info fields shall not carry a VHT format of HT Control field with MRQ set to 1, unless all the STAs listed in the AID field of the STA Info fields have advertized support for the solicited link adaptation. In other words, MRQ shall not be sent to STAs that have not set a VHT Link Adaptation Capable subfield in the most recently transmitted VHT Capabilities Info field of the VHT Capabilities element to a value that indicates that solicited link adaptation is supported. In some aspects, such a value indicates that a STA supports "both" solicited and unsolicited link adaptation.

In the event the transmission of an NDPA including an MRQ and listing multiple STA Info fields is not allowed, the transmitter (e.g., the base station) will decide between using multi-station NDPA or requesting link adaptation. That is, in this case, these two operations are not performed at the same time.

In accordance with another aspect of the disclosure, in a scenario where MU feedback is requested, a station may respond with SU feedback. Here, it should be appreciated that during sounding for an MU scenario, an accurate estimation of the MU MCS is not obtained from a single one of the stations. Nevertheless, information regarding the status of a link may still be useful for MU rate prediction. For example, an MFB computed assuming SU beamforming may be leveraged to improve the rate selection for the MU-MIMO case, with the appropriate interpretation (e.g., the feedback from different stations may provide an indication of relative rates to be used for the MU-based transmissions to these stations). Moreover, MU feedback may be used for SU beamforming (e.g., where, for the MFB, it is assumed that SU beamforming is correct).

Thus, in accordance with the teachings herein, SU feedback may be sent for an MU feedback request (e.g., an NDPA where the STA Info feedback type field is set to MU). If the MFB is sent in the same PPDU as a VHT-CB frame (e.g., of type MU, or even type SU), the MFB responder shall estimate the recommended MFB under the assumption that the MFB requester (receiver) will use the steering matrices contained therein for performing a SU beamformed transmission.

Various advantages may be achieved through the use of such a scheme. In some aspects, the response to SU and MU requests may be identical. In some aspects, MU feedback may be used for SU beamforming as well. Such a scheme may provide improved rate adaption for MU.

Figure 4:
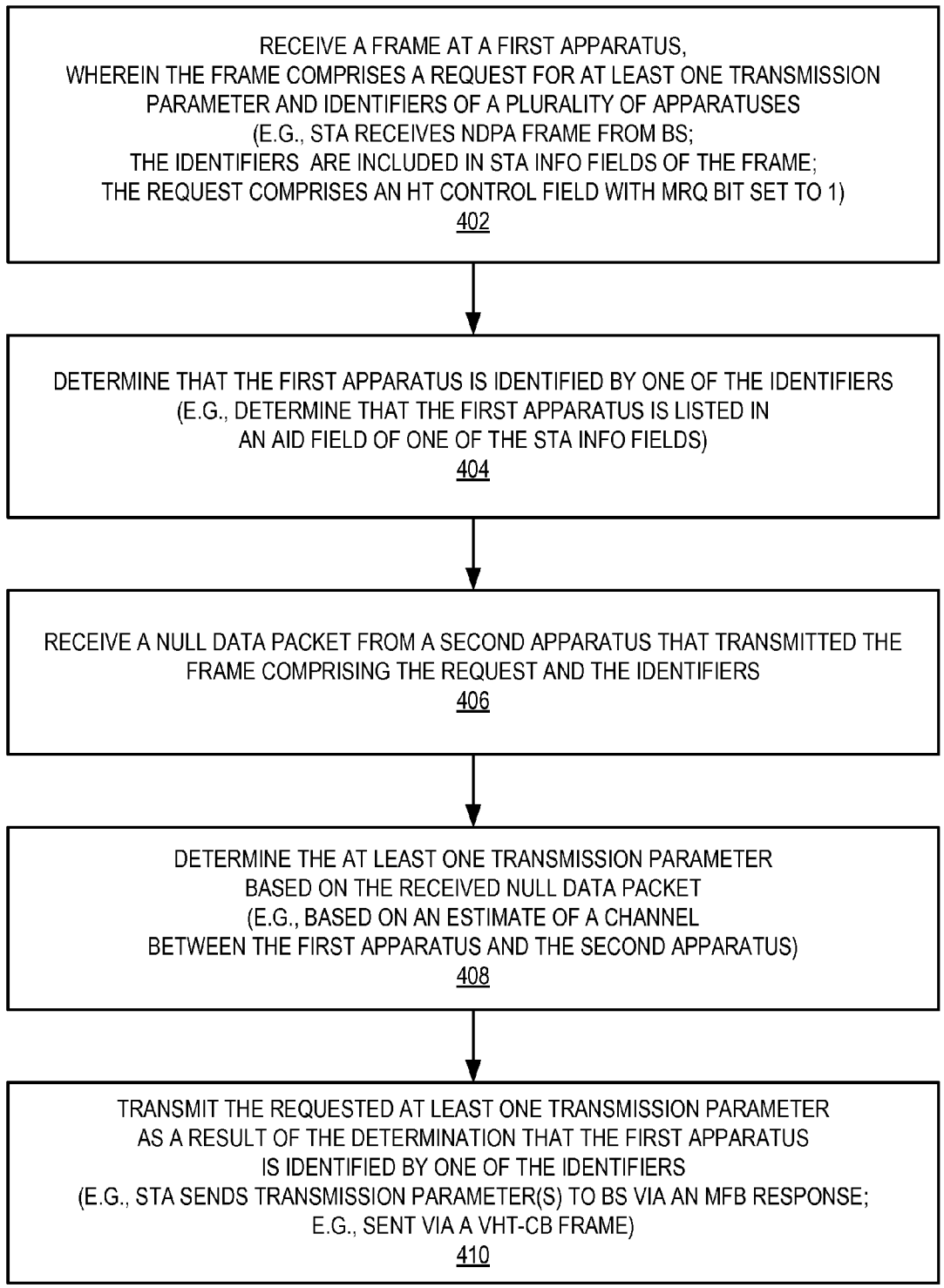
FIG. 4 is a flowchart of several sample aspects of operations performed in conjunction with the use of a frame that comprises a transmission parameter request and that identifies multiple destinations in accordance with the teachings herein.
Figure 5:
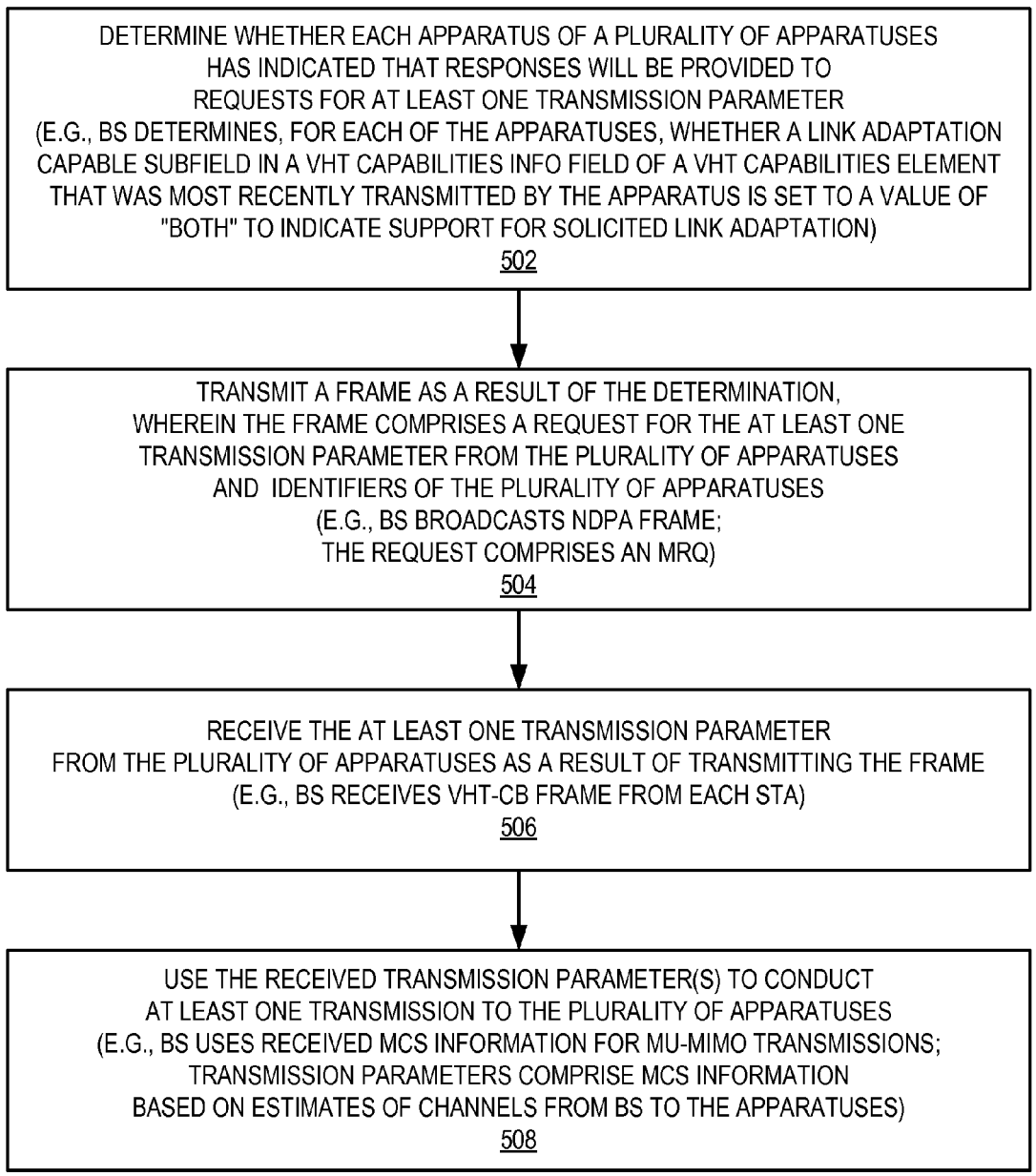
FIG. 5 is a flowchart of several sample aspects of operations performed in conjunction with controlling whether to transmit a frame that comprises a transmission parameter request and that identifies multiple destinations in accordance with the teachings herein.
Figure 6:
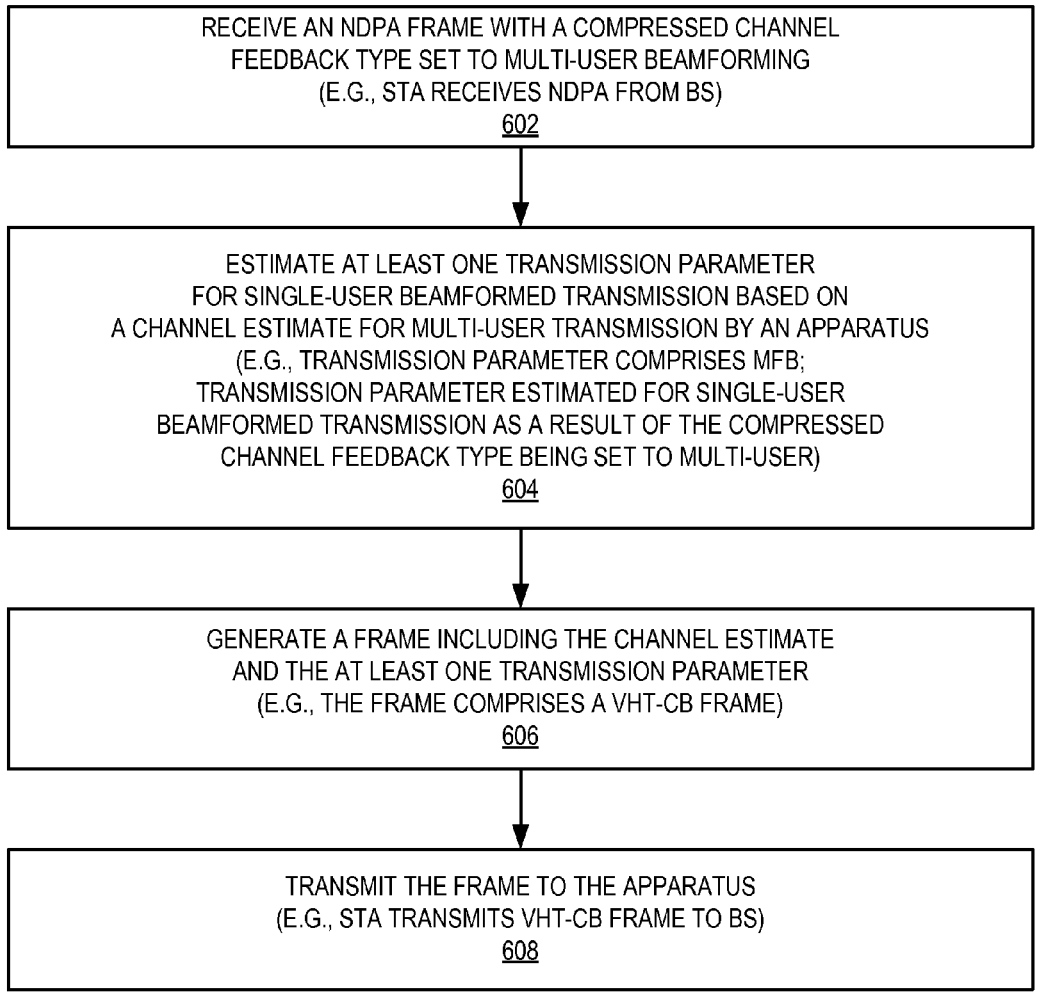
FIG. 6 is a flowchart of several sample aspects of operations performed in conjunction with generating a frame including a channel estimate in accordance with the teachings herein.

With the above in mind, FIGS. 4-6 illustrate sample operations that may be performed to provide MU link adaptation in accordance with the teachings herein. For purposes of illustration, the operations of FIGS. 4-6 (or any other operations discussed or taught herein) may be described as being performed by specific components. These operations may be performed by other types of components and may be performed using a different number of components in other implementations. Also, it should be appreciated that one or more of the operations described herein may not be employed in a given implementation. For example, one entity may perform a subset of the operations and pass the result of those operations to another entity.

FIG. 4 is directed to operations that are performed at a first apparatus that receives a frame that requests at least one transmission parameter and that identifies multiple destinations. In some aspects, these operations are performed by an 802.11ac station.

As represented by block 402 of FIG. 4, at some point in time, a first apparatus receives a frame. For example, a station may receive an NDPA frame from a nearby BS whereby, in some aspects, the NDPA serves to indicate that a null data packet will follow. Here, the received frame comprises a request for at least one transmission parameter and also comprises identifiers of a plurality of apparatuses. For example, as discussed above, the request may comprise an HT control field with MRQ bit set to 1, and the identifiers (e.g., AIDs) may be included in STA Info fields of the frame.

As represented by block 404, a determination is made as to whether the first apparatus is identified by one of the identifiers. For example, a station may determine that it is listed in an AID field of one of the STA Info fields.

As represented by block 406, the first apparatus may also receive a null data packet from a second apparatus (e.g., the base station) that transmitted the frame received at block 402. In some aspects, the null data packet comprises a training sequence that may be used to sound a receiver to enable the receiver to estimate a channel between a transmitter (e.g., a base station) and the receiver (e.g., a station).

In this case, as represented by block 408, the first apparatus determines at least transmission parameter (e.g., MCS) based on the received null data packet. For example, the first apparatus may estimate a channel between the first and second apparatuses, and generate the transmission parameter(s) based on the estimate of the channel.

As represented by block 410, as a result of the determination of block 404, the first apparatus transmits the at least one transmission parameter. For example, a station may transmit transmission parameters to a base station via an MFB response (e.g., via a VHT-CB frame).

A transmission parameter may take various forms in accordance with the teachings herein. In general, as used herein, a transmission parameter specifies how information is transmitted over a wireless medium. This is in contrast to, for example, a measured characteristic of a channel (e.g., a channel quality indication (CQI). Examples of transmission parameters include, without limitation, modulation and coding scheme (e.g., 64 QAM, etc.), type of coding, number of spatial streams, target bandwidth, minimum bandwidth, maximum bandwidth, target signal to noise ratio (SNR), minimum SNR, maximum SNR, and so on.

FIG. 5 is directed to operations that are performed in conjunction with controlling whether to transmit a frame that requests at least one transmission parameter and that identifies multiple destinations. In some aspects, these operations are performed by an 802.11ac base station.

As represented by block 502, a determination is made as to whether each apparatus of a plurality of apparatuses has indicated that responses will be provided to requests for at least one transmission parameter. For example, as discussed above, a base station may determine, for each of a set of stations, whether a Link Adaptation Capable subfield in a very high throughput (VHT) Capabilities Info field of a VHT Capabilities element that was most recently transmitted by the station is set to a value that indicates support for solicited link adaptation (e.g., a value indicating that "Both" solicited and unsolicited link adaptation is supported).

As represented by block 504, as a result of the determination of block 502, the frame is transmitted. Continuing with the above example, if each of the stations has indicated that responses will be provided, the base station will broadcast the frame (e.g., an NDPA frame).

Here, the frame comprises a request for the at least one transmission parameter from the plurality of apparatuses along with identifiers of the plurality of apparatuses. For example, the request may comprise an MRQ and the frame may include STA Info fields as discussed herein.

As represented by block 506, as a result of transmitting the frame at block 504, at least one transmission parameter is received from the plurality of apparatuses. For example, a base station may receive a VHT-CB frame from each of the stations identified at block 502.

As represented by block 508, the received transmission parameter(s) is/are used to conduct at least one transmission to the plurality of apparatuses. For example, the base station may use received MCS information for MU-MIMO transmissions (e.g. to determine how much transmit power to use for each channel). As discussed above, each station may provide this MCS information based on a respective estimate of a channel from the base station to that station.

FIG. 6 is directed to operations that are performed in conjunction with transmitting transmission parameter feedback in response to a feedback request that specifies MU mode. In some aspects, these operations are performed by an 802.11ac station.

As represented by block 602, at some point in time, an NDPA frame with a compressed channel feedback type set to MU beamforming may be received. For example, a station may receive an NDPA frame from a nearby base station as discussed above.

As represented by block 604, at least one transmission parameter for SU beamformed transmission is estimated based on a channel estimate for MU transmission by an apparatus. For example, a station may generate a channel estimate for an MU transmission to be conducted by a base station based on a null data packet received from the base station. The station may then estimate at least one transmission parameter (e.g., MCS, number of spatial streams, etc.) based on the channel estimate. Here, the transmission parameter is estimated for SU beamformed transmission even though the compressed channel feedback type is set to MU.

As represented by block 606, a frame including the channel estimate and the at least one transmission parameter estimated at block 604 is generated. For example, a station may generate a data set to be transmitted as a VHT-CB frame and store the data set in a memory device (e.g., of a wireless transceiver).

As represented by block 608, the frame including the at least one transmission parameter and the channel estimate (e.g., compressed steering matrices) is transmitted. For example, the station may transmit the data from the data set (e.g., after encoding, etc.) in the order and with the timing specified for the frame (e.g., a packet). Thus, in an 802.11 environment, a station may transmit a VHT-CB frame to a base station at block 608.

Figure 7:
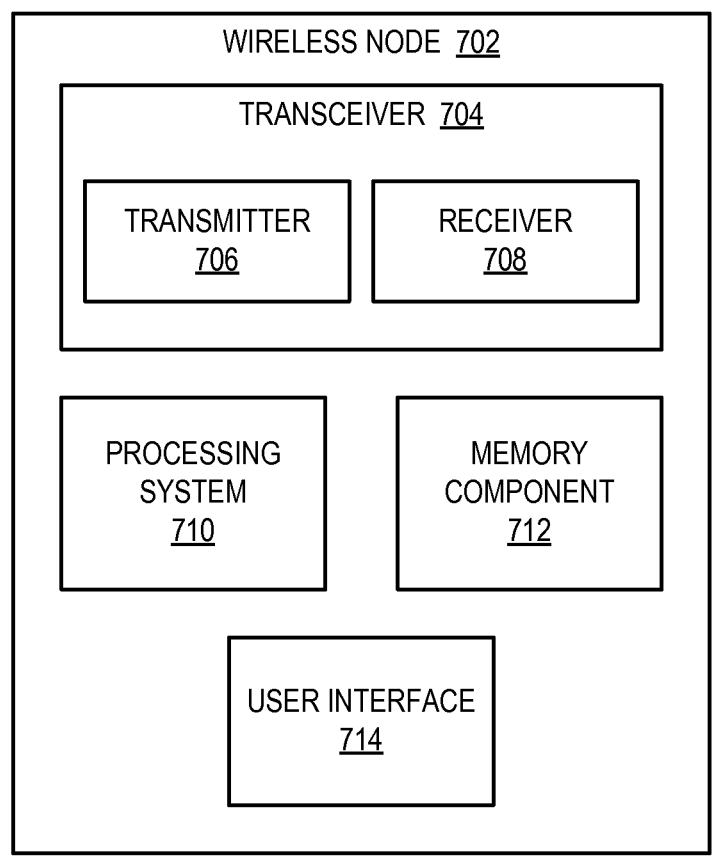
FIG. 7 is a simplified block diagram of several sample aspects of components that may be employed in communication nodes in accordance with the teachings herein.

FIG. 7 illustrates several sample components (represented by corresponding blocks) that are incorporated into an apparatus to provide functionality as taught herein. For purposes of illustration these components will be described in the context of a wireless node 702. It should be appreciated, however, that these components may be implemented in different types of apparatuses in different implementations (e.g., in an ASIC, in a system on a chip (SoC), etc.). In some aspects, the wireless node 702 represents an access terminal (e.g., corresponding to each of the access terminals 106 and 108 of FIG. 1). In some aspects, the wireless node 702 represents an access point (e.g., corresponding to the access point 102 of FIG. 1). The wireless node 702 may represent another type of device in other aspects. The components described in FIG. 7 may be incorporated into other nodes in a communication system. Also, a given node may contain one or more of the described components. For example, a wireless node may contain multiple transceiver components that enable the wireless node to operate on multiple carriers and/or communicate via different technologies.

As shown in FIG. 7, the wireless node 702 includes one or more transceivers (as represented by a transceiver 704) for communicating with other nodes. Each transceiver 704 includes a transmitter 706 for transmitting signals (e.g., parameters, frames, packets, and other information) and a receiver 708 for receiving signals (e.g., parameters, frames, packets, and other information).

The wireless node 702 also includes other components that are used in conjunction with the MU link adaptation operations as taught herein. For example, the wireless node 702 includes a processing system 710 for processing received signals and/or signals to be transmitted (e.g., making determinations, generating frames, estimating transmission parameters, including transmission parameters in frames, and so on) and for providing other related functionality as taught herein. The wireless node 702 includes a memory component 712 (e.g., including a memory device) for maintaining information (e.g., parameters, frame data, and so on). The wireless node 702 also includes a user interface 714 for providing indications (e.g., audible and/or visual indications) to a user and/or for receiving user input (e.g., upon user actuation of a sensing device such a microphone, a camera, a keypad, and so on).

The components of FIG. 7 may be implemented in various ways. In some implementations the components of FIG. 7 are implemented in one or more circuits such as, for example, one or more processors and/or one or more ASICs (which may include one or more processors). Here, each circuit (e.g., processor) may use and/or incorporate memory for storing information or executable code used by the circuit to provide this functionality. For example, some of the functionality represented by block 704 and some or all of the functionality represented by blocks 710-714 may be implemented by a processor or processors of a wireless node and memory of the wireless node (e.g., by execution of appropriate code and/or by appropriate configuration of processor components).

Figure 8:
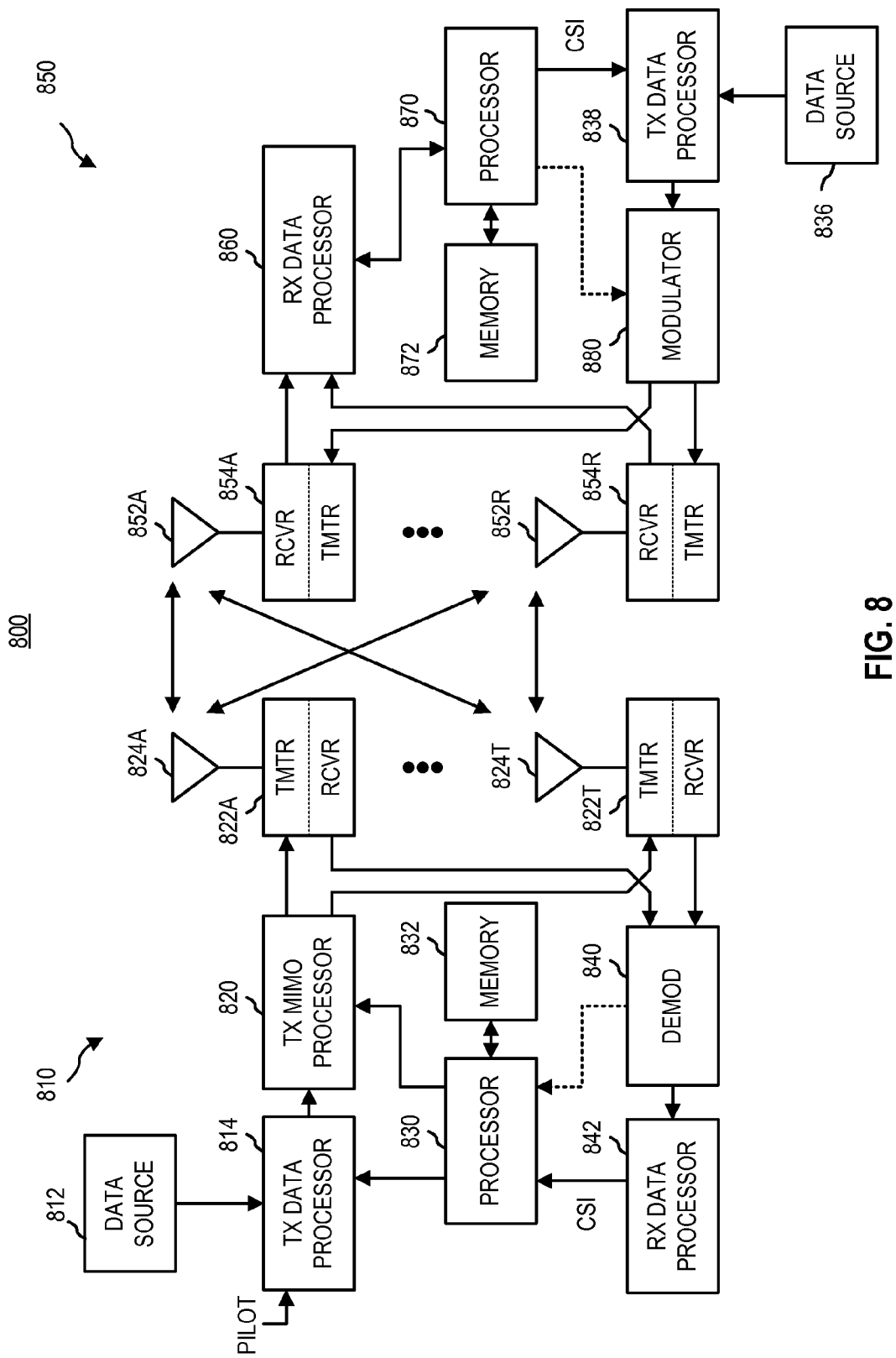
FIG. 8 is a simplified block diagram of several sample aspects of communication components.

FIG. 8 illustrates in more detail sample components that may be employed in a pair of wireless nodes of a MIMO system 800. In this example, the wireless nodes are labeled as a wireless device 810 (e.g., an access point) and a wireless device 850 (e.g., an access terminal). It should be appreciated that a MU-MIMO system will include other devices (e.g., access terminals) similar to the wireless device 850. To reduce the complexity of FIG. 8, however, only one such device is shown.

The MIMO system 800 employs multiple ($N_T$) transmit antennas and multiple ($N_R$) receive antennas for data transmission. A MIMO channel formed by the $N_T$ transmit and $N_R$ receive antennas is decomposed into $N_S$ independent channels, which are also referred to as spatial channels, where $N_S \leq \min\{N_T, N_R\}$.

The MIMO system 800 supports time division duplex (TDD) and/or frequency division duplex (FDD). In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Referring initially to the device 810, traffic data for a number of data streams is provided from a data source 812 to a transmit (TX) data processor 814. Each data stream is then transmitted over a respective transmit antenna.

The TX data processor 814 formats, codes, and interleaves the traffic data for each data stream based on a particular coding scheme selected for that data stream to provide coded data. The coded data for each data stream is multiplexed with pilot data using OFDM techniques or other suitable techniques. The pilot data is typically a known data pattern that is processed in a known manner and used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream are typically determined by instructions performed by a processor 830. A memory 832 stores program code, data, and other information used by the processor 830 or other components of the device 810.

The modulation symbols for all data streams are then provided to a TX MIMO processor 820, which further processes the modulation symbols (e.g., for OFDM). The TX MIMO processor 820 then provides $N_T$ modulation symbol streams to $N_T$ transceivers (XCVR) 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver (XCVR) 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive (RX) data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which precoding matrix to use (discussed below). The processor 870 formulates a reverse link message comprising a matrix index portion and a rank value portion. A memory 872 stores program code, data, and other information used by the processor 870 or other components of the device 850.

The reverse link message comprises various types of information regarding the communication link and/or the received data stream. The reverse link message is processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator (DEMOD) 840, and processed by a RX data processor 842 to extract the reverse link message transmitted by the device 850. The processor 830 then determines which precoding matrix to use for determining the beamforming weights by processing the extracted message.

In some implementations, the receive data processor 860 and/or the processor 870 performs the link adaptation operations described herein. It should be appreciated that these operations may be performed in cooperation with other components of FIG. 8 and/or by other components of FIG. 8 in some implementations.

A wireless node may include various components that perform functions based on signals that are transmitted by or received at the wireless node. For example, in some implementations, a wireless node comprises an antenna (e.g., coupled to transceiver) for transmitting and receiving signals (e.g., comprising frames, etc.). As another example, in some implementations, a wireless node comprises a user interface configured: to output an indication based on information received by a transceiver through the use of at least one transmission parameter and/or to provide information to be transmitted by a transceiver through the use of at least one transmission parameter.

A wireless node as taught herein may communicate via one or more wireless communication links that are based on or otherwise support any suitable wireless communication technology. For example, in some aspects a wireless node may associate with a network such as a local area network (e.g., a Wi-Fi network) or a wide area network. To this end, a wireless node may support or otherwise use one or more of a variety of wireless communication technologies, protocols, or standards such as, for example, Wi-Fi, WiMAX, CDMA, TDMA, OFDM, and OFDMA. Also, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The teachings herein may be incorporated into (e.g., implemented within or performed by) a variety of apparatuses (e.g., devices). For example, one or more aspects taught herein may be incorporated into a phone (e.g., a cellular phone), a personal data assistant (PDA), an entertainment device (e.g., a music or video device), a headset (e.g., headphones, an earpiece, etc.), a microphone, a medical sensing device (e.g., a sensor such as a biometric sensor, a heart rate monitor, a pedometer, an EKG device, a smart bandage, a vital signal monitor, etc.), a user I/O device (e.g., a watch, a remote control, a switch such as a light switch, a keyboard, a mouse, etc.), an environment sensing device (e.g., a tire pressure monitor), a monitor that may receive data from the medical or environment sensing device, a computer, a point-of-sale device, an entertainment device, a hearing aid, a set-top box, a gaming device, or any other suitable device. The communication devices described herein may be used in any type of sensing application, such as for sensing automotive, athletic, and physiological (medical) responses. Any of the disclosed aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitudes of applications that may incorporate any aspect of the disclosure as described herein.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a wireless node comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless node also may be capable of transmitting and/or receiving information in a non-wireless manner (e.g., via a wired connection) via an appropriate communication interface.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

Figure 9:
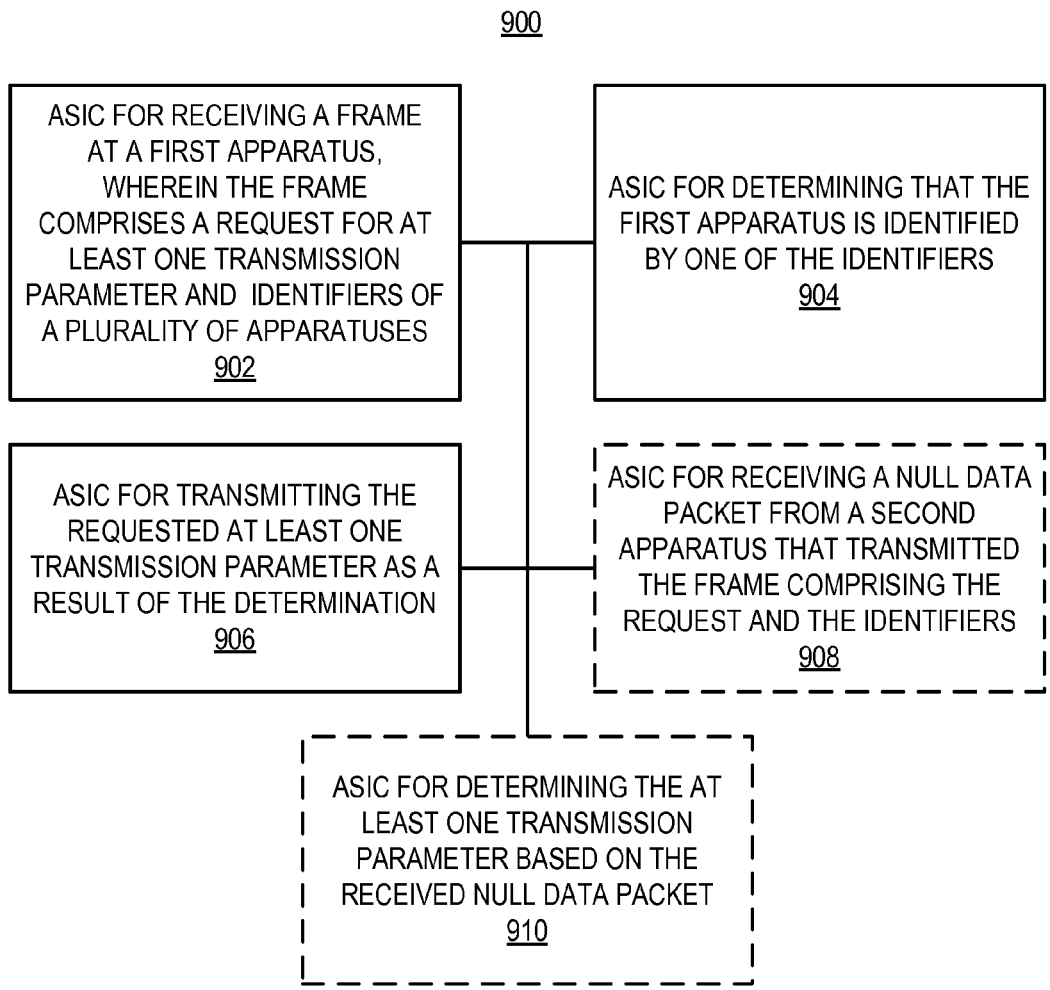
FIGS. 9-11 are simplified block diagrams of several sample aspects of apparatuses configured to support link adaption in accordance with the teachings herein.
Figure 10:
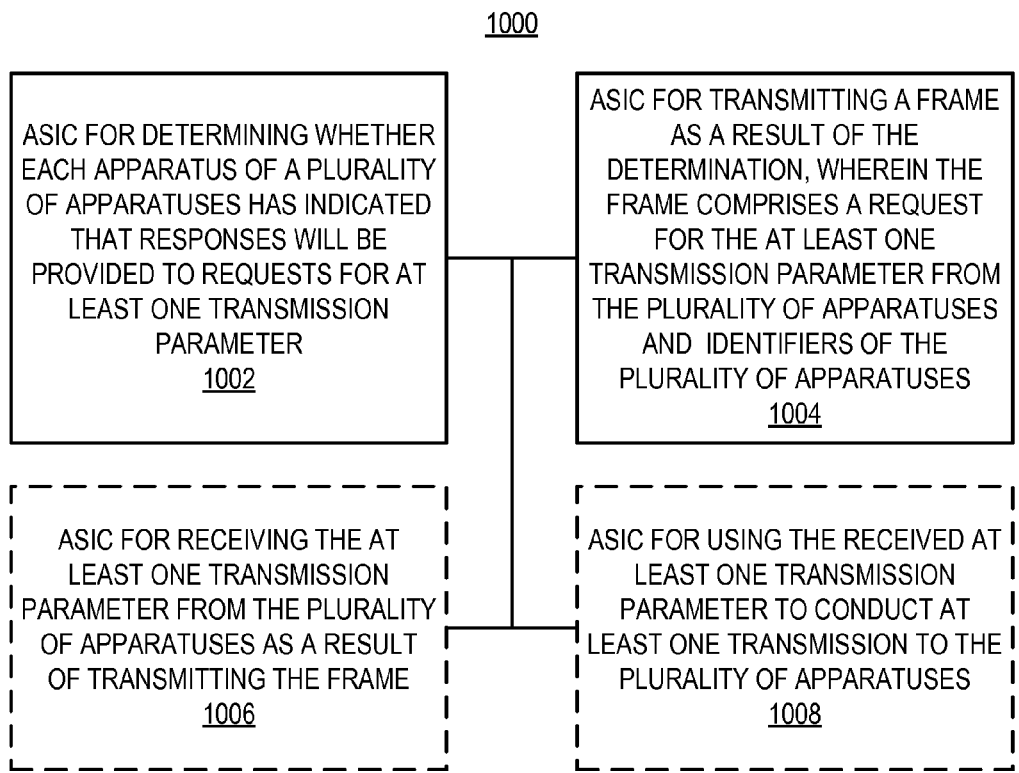
Figure 11:
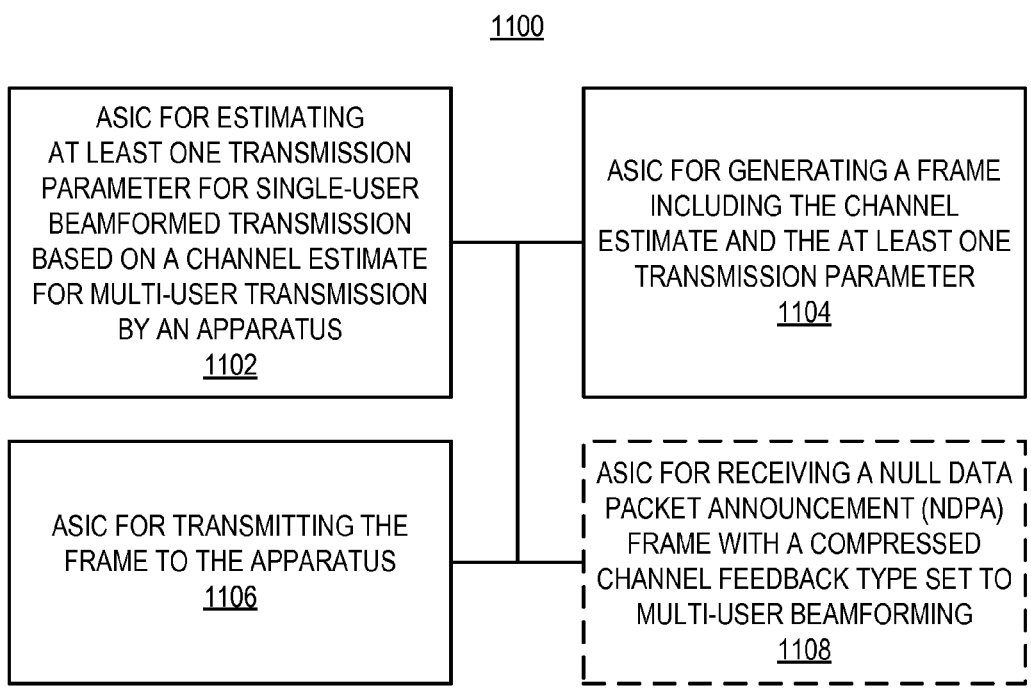

The components described herein may be implemented in a variety of ways. Referring to FIGS. 9-11, apparatuses 900, 1000, and 1100 are represented as a series of interrelated functional blocks that represent functions implemented by, for example, one or more integrated circuits (e.g., an ASIC) or implemented in some other manner as taught herein. As discussed herein, an integrated circuit may include a processor, software, other components, or some combination thereof.

The apparatuses 900, 1000, and 1100 includes one or more modules that perform one or more of the functions described above with regard to various figures. For example, an ASIC for receiving a frame at a first apparatus, wherein the frame comprises a request for at least one transmission parameter and that further comprises identifiers of a plurality of apparatuses 902 may correspond to, for example, a transceiver as discussed herein. An ASIC for determining that the first apparatus is identified by one of the identifiers 904 may correspond to, for example, a processing system as discussed herein. An ASIC for transmitting the requested at least one transmission parameter as a result of the determination 906 may correspond to, for example, a transceiver as discussed herein. An ASIC for receiving a null data packet from a second apparatus that transmitted the frame comprising the request and the identifiers 908 may correspond to, for example, a transceiver as discussed herein. An ASIC for determining the at least one transmission parameter based on the received null data packet 910 may correspond to, for example, a processing system as discussed herein. An ASIC for determining whether each apparatus of a plurality of apparatuses has indicated that responses will be provided to requests for at least one transmission parameter 1002 may correspond to, for example, a processing system as discussed herein. An ASIC for transmitting a frame as a result of the determination, wherein the frame comprises a request for the at least one transmission parameter from the plurality of apparatuses and identifiers of the plurality of apparatuses 1004 may correspond to, for example, a transceiver as discussed herein. An ASIC for receiving the at least one transmission parameter from the plurality of apparatuses as a result of transmitting the frame 1006 may correspond to, for example, a transceiver as discussed herein. An ASIC for using the received at least one transmission parameter to conduct at least one transmission to the plurality of apparatuses 1008 may correspond to, for example, a transceiver as discussed herein. An ASIC for estimating at least one transmission parameter for SU beamformed transmission based on a channel estimate for MU transmission by an apparatus 1102 may correspond to, for example, a processing system as discussed herein. An ASIC for generating a frame including the channel estimate and the at least one transmission parameter 1104 may correspond to, for example, a processing system as discussed herein. An ASIC for transmitting the frame to the apparatus 1106 may correspond to, for example, a transceiver as discussed herein. An ASIC for receiving a null data packet announcement (NDPA) frame with a compressed channel feedback type set to multi-user beamforming 1108 may correspond to, for example, a transceiver as discussed herein.

As noted above, in some aspects these components may be implemented via appropriate processor components. These processor components may in some aspects be implemented, at least in part, using structure as taught herein. In some aspects a processor may be configured to implement a portion or all of the functionality of one or more of these components. In some aspects, one or more of any components represented by dashed boxes are optional.

As noted above, the apparatuses 900, 1000, and 1100 each comprise one or more integrated circuits in some implementations. For example, in some aspects a single integrated circuit implements the functionality of one or more of the illustrated components, while in other aspects more than one integrated circuit implements the functionality of one or more of the illustrated components.

In addition, the components and functions represented by FIGS. 9-11 as well as other components and functions described herein, may be implemented using any suitable means. Such means are implemented, at least in part, using corresponding structure as taught herein. For example, the components described above in conjunction with the "ASIC for" components of FIGS. 9-11 correspond to similarly designated "means for" functionality. Thus, one or more of such means is implemented using one or more of processor components, integrated circuits, or other suitable structure as taught herein in some implementations.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for wireless communication, comprising:
a transceiver configured to receive a plurality of link adaptation indications from a plurality of other apparatuses; and
a processor coupled to the transceiver and configured to determine, based on the received link adaptation indications, whether each apparatus of the plurality of other apparatuses has indicated that responses will be provided to requests for at least one transmission parameter, and further configured to generate a frame if the determination indicates that each apparatus of the plurality of other apparatuses has indicated that responses will be provided, wherein the frame comprises a request for the at least one transmission parameter from the plurality of other apparatuses and further comprises identifiers of the plurality of other apparatuses,
wherein the transceiver is further configured to transmit the frame.

2. The apparatus of claim 1, wherein:
the request for the at least one transmission parameter comprises a modulation and coding scheme request (MRQ); and
the determination of whether each apparatus of the plurality of other apparatuses has indicated that responses will be provided comprises a determination, for each of the other apparatuses, of whether a Link Adaptation Capable subfield in a very high throughput (VHT) Capabilities Info field of a VHT Capabilities element that was most recently transmitted by the other apparatus is set to a value that indicates support for solicited link adaptation.

3. The apparatus of claim 1, wherein:
the frame comprises a null data packet announcement (NDPA) frame;
the identifiers are included in station information (STA Info) fields of the NDPA frame; and
the request for the at least one transmission parameter comprises a modulation and coding scheme request (MRQ) indicated in a control field of the NDPA frame.

4. The apparatus of claim 1, wherein the transceiver is further configured to receive the at least one transmission parameter from the plurality of other apparatuses as a result of the transmission of the frame.

5. The apparatus of claim 4, wherein the transceiver is further configured to use the received at least one transmission parameter to conduct at least one transmission to the plurality of other apparatuses.

6. The apparatus of claim 4, wherein the at least one transmission parameter comprises modulation and coding scheme information based on estimates of channels between the apparatus for wireless communication and the plurality of other apparatuses.

7. A method of wireless communication, comprising:
receiving a plurality of link adaptation indications from a plurality of apparatuses;
determining, based on the received link adaptation indications, whether each apparatus of the plurality of apparatuses has indicated that responses will be provided to requests for at least one transmission parameter;
generating a frame if the determination indicates that each apparatus of the plurality of apparatuses has indicated that responses will be provided, wherein the frame comprises a request for the at least one transmission parameter from the plurality of apparatuses and further comprises identifiers of the plurality of apparatuses; and
transmitting the frame.

8. The method of claim 7, wherein:
the request for the at least one transmission parameter comprises a modulation and coding scheme request (MRQ); and
the determination of whether each apparatus of the plurality of apparatuses has indicated that responses will be provided comprises determining, for each of the apparatuses, whether a Link Adaptation Capable subfield in a very high throughput (VHT) Capabilities Info field of a VHT Capabilities element that was most recently transmitted by the apparatus is set to a value that indicates support for solicited link adaptation.

9. The method of claim 7, wherein:
the frame comprises a null data packet announcement (NDPA) frame;
the identifiers are included in station information (STA Info) fields of the NDPA frame; and
the request for the at least one transmission parameter comprises a modulation and coding scheme request (MRQ) indicated in a control field of the NDPA frame.

10. The method of claim 7, further comprising receiving the at least one transmission parameter from the plurality of apparatuses as a result of transmitting the frame.

11. The method of claim 10, further comprising using the received at least one transmission parameter to conduct at least one transmission to the plurality of apparatuses.

12. The method of claim 10, wherein the at least one transmission parameter comprises modulation and coding scheme information based on estimates of channels between an apparatus that transmitted the frame and the plurality of apparatuses.

13. An apparatus for wireless communication, comprising:
means for receiving a plurality of link adaptation indications from a plurality of other apparatuses;
means for determining, based on the received link adaptation indications, whether each apparatus of the plurality of other apparatuses has indicated that responses will be provided to requests for at least one transmission parameter;
means for generating a frame if the determination indicates that each apparatus of the plurality of other apparatuses has indicated that responses will be provided, wherein the frame comprises a request for the at least one transmission parameter from the plurality of other apparatuses and further comprises identifiers of the plurality of other apparatuses; and
means for transmitting the frame.

14. The apparatus of claim 13, wherein:
the request for the at least one transmission parameter comprises a modulation and coding scheme request (MRQ); and
the determination of whether each apparatus of the plurality of other apparatuses has indicated that responses will be provided comprises a determination, for each of the other apparatuses, of whether a Link Adaptation Capable subfield in a very high throughput (VHT) Capabilities Info field of a VHT Capabilities element that was most recently transmitted by the other apparatus is set to a value that indicates support for solicited link adaptation.

15. The apparatus of claim 13, wherein:
the frame comprises a null data packet announcement (NDPA) frame;
the identifiers are included in station information (STA Info) fields of the NDPA frame; and
the request for the at least one transmission parameter comprises a modulation and coding scheme request (MRQ) indicated in a control field of the NDPA frame.

16. The apparatus of claim 13, further comprising means for receiving the at least one transmission parameter from the plurality of other apparatuses as a result of the transmission of the frame.

17. The apparatus of claim 16, further comprising means for using the received at least one transmission parameter to conduct at least one transmission to the plurality of other apparatuses.

18. The apparatus of claim 16, wherein the at least one transmission parameter comprises modulation and coding scheme information based on estimates of channels between the apparatus for wireless communication and the plurality of other apparatuses.

19. A non-transitory computer-readable storage medium storing codes executable by a computer to:
- receive a plurality of link adaptation indications from a plurality of apparatuses;
- determine, based on the received link adaptation indications, whether each apparatus of the plurality of apparatuses has indicated that responses will be provided to requests for at least one transmission parameter;
- generate a frame if the determination indicates that each apparatus of the plurality of apparatuses has indicated that responses will be provided, wherein the frame comprises a request for the at least one transmission parameter from the plurality of apparatuses and further comprises identifiers of the plurality of apparatuses; and
- transmit the frame.

20. A wireless node, comprising:
- an antenna;
- a transceiver coupled to the antenna and configured to receive a plurality of link adaptation indications from a plurality of other wireless nodes; and
- a processor coupled to the transceiver and configured to determine, based on the received link adaptation indications, whether each wireless node of the plurality of other wireless nodes has indicated that responses will be provided to requests for at least one transmission parameter, and further configured to generate a frame if the determination indicates that each wireless node of the plurality of other wireless nodes has indicated that responses will be provided, wherein the frame comprises a request for the at least one transmission parameter from the plurality of other wireless nodes and further comprises identifiers of the plurality of other wireless nodes,
- wherein the transceiver is further configured to transmit the frame via the antenna.

* * * * *